(12) United States Patent
Herber (10) Patent No.: US 11,985,217 B2
(45) Date of Patent: May 14, 2024

(54) NETWORK INTERFACE APPARATUS

(71) Applicant: NXP B.V., Eindhoven (NL)

(72) Inventor: Christian Herber, Hamburg (DE)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 18/160,398

(22) Filed: Jan. 27, 2023

(65) Prior Publication Data

US 2023/0275981 A1 Aug. 31, 2023

(30) Foreign Application Priority Data

Jan. 28, 2022 (EP) .................................... 22154016

(51) Int. Cl.
*H04L 69/22* (2022.01)
*H04L 69/16* (2022.01)
*H04L 69/28* (2022.01)

(52) U.S. Cl.
CPC .............. *H04L 69/28* (2013.01); *H04L 69/16* (2013.01); *H04L 69/22* (2013.01)

(58) Field of Classification Search
None
See application file for complete search history.

(56) References Cited

U.S. PATENT DOCUMENTS

| | | | |
|---|---|---|---|
| 5,621,734 A * | 4/1997 | Mann | H04L 9/40 709/227 |
| 6,721,799 B1 | 4/2004 | Slivkoff | |
| 2004/0165530 A1 * | 8/2004 | Bedekar | H04L 49/9078 370/235 |
| 2010/0074273 A1 | 3/2010 | Ji | |
| 2015/0003456 A1 * | 1/2015 | Seo | H04L 12/28 370/392 |
| 2015/0067819 A1 * | 3/2015 | Shribman | H04L 63/0407 709/218 |

(Continued)

FOREIGN PATENT DOCUMENTS

| | | |
|---|---|---|
| CN | 102780705 A | 11/2012 |
| WO | WO-2015/106827 A1 | 7/2015 |

OTHER PUBLICATIONS

AUTOSAR; "Specification of CAN Transport Layer—Release 4.2.1"; 97 pages (Oct. 31, 2014).

(Continued)

*Primary Examiner* — James A Edwards
(74) *Attorney, Agent, or Firm* — Jonathan J. Sapan (57) ABSTRACT

An apparatus for providing an interface between a first network that operates based on a first protocol and a second network that operates based on a second protocol, includes a receive terminal configured to receive one or more first messages encoded according to the first protocol, the first messages encapsulating a plurality of second messages. The apparatus is configured to extract encapsulated second messages, determine for each of extracted second messages, and based on flow identifying information of each of extracted second messages, a flow to which the extracted second message belongs. The extracted second messages of the flow provide for transmission of the extracted second messages on the second network encoded based on the second protocol with a time spacing there between greater than a predetermined minimum time spacing.

20 Claims, 3 Drawing Sheets

(56) References Cited

U.S. PATENT DOCUMENTS

2015/0341263 A1 11/2015 Du
2018/0276175 A1* 9/2018 Chandhoke ........... G06F 9/4881

OTHER PUBLICATIONS

Autosar; "Specification of Socket Adaptor—Release R20-11"; 157 pages (Nov. 30, 2020).
International Standard; "ISO 15765-2, Third Edition, Road vehicles—diagnostic communication over Controller Area Network (DoCAN—Part 2: Transport protocol and network layer services"; 58 pages (Feb. 2016).
IEEE; IEEE Standard for a Transport Protocol for Time-Sensitive Applications in Bridged Local Area Networks—IEEE Std 1722-2016 (Revision of IEEE Std 1722-2011), Section 9; pp. 77-81; (Dec. 16, 2016).

* cited by examiner

NETWORK INTERFACE APPARATUS

CROSS-REFERENCE TO RELATED APPLICATIONS

This application claims the priority under 35 U.S.C. § 119 of European patent application no. 22154016.4, filed Jan. 28, 2022 the contents of which are incorporated by reference herein.

FIELD

The present disclosure relates to apparatus for providing an interface between networks. In particular, it relates to an apparatus for providing an interface between a first network configured to operate based on a first protocol and a at least a second network configured to operate based on a different, second protocol. It also relates to a network and a method of operating an apparatus and method of operating a system.

BACKGROUND

In-vehicle network (IVN) buses, such as CAN (Controller Area Network), CAN FD (CAN with Flexible Data-Rate), LIN (Local Interconnect Network), FlexRay, Ethernet based network buses, and other types, can be used for communications within vehicles. For example, controller area network (CAN) bus is a message-based communications bus protocol that is often used within automobiles. It will be appreciated that CAN networks also have application outside of the field of automobiles. A CAN bus network may include multiple bus devices, so called nodes or electronic control units (ECUs), such as an engine control module (ECM), a power train control module (PCM), airbags, antilock brakes, cruise control, electric power steering, audio systems, windows, doors, mirror adjustment, battery and recharging systems for hybrid/electric cars, and many more. The CAN bus protocol is used to enable communications between the various bus devices. The data link layer of the CAN protocol is standardized as International Standards Organization (ISO) 11898-1:2003. CAN Flexible Data-Rate or "CAN FD," which is an extension of the standardized CAN data link layer protocol and is meanwhile integrated into the ISO11898-1:2015 standard, can provide higher data rates. The standardized CAN data link layer protocol is being further extended to provide even higher data rates. A further extension, referred to as CAN XL, with a new level scheme allowing even higher data rates is in the definition phase discussed under CiA610 (CAN in Automation) and is moving towards standardization in the form of either a further update of the existing ISO11898 standards or a new standard.

In some examples, there may be more than one type of network provided connectivity for a system, such as an automobile. For example, it is known to provide a network that comprises a first component network configured to operate based on a first protocol, such as the Ethernet protocol, and a second component network configured to operate based on a second protocol, such as the CAN protocol or FlexRay or LIN, wherein the first and second component networks are coupled together. An apparatus, which is sometimes termed a gateway, may provide an interface between the first and second component networks. The apparatus or gateway may allow for one or more messages from a node coupled to the first network part to reach a node coupled to the second network part and vice versa.

SUMMARY

According to a first aspect of the present disclosure there is provided an apparatus for providing an interface between a first network configured to operate based on a first protocol and at least a second network configured to operate based on a second protocol, different to the first protocol, the apparatus comprising:

a receive terminal configured to receive one or more first messages from the first network encoded according to the first protocol wherein said one or more first messages encapsulate a plurality of second messages; and wherein said apparatus is configured to:
extract said encapsulated second messages from said one or more first messages;
determine, for each of said extracted second messages, and based on flow identifying information of each of said extracted second messages, a flow to which the extracted second message belongs, said flow comprising a set of a plurality of the extracted second messages; and
for said extracted second messages that belong to the same flow, provide for transmission of said extracted second messages on the second network encoded based on the second protocol with a time spacing therebetween greater than a predetermined minimum time spacing.

In one or more examples, the set of plural messages that form a flow are intended for the same node coupled to the second network. In one or more examples, the flow comprises a set of plural second messages that collectively comprise information that is divided over the set of extracted second messages. In one or more examples, the flow comprises a set of messages that are processed by a transport layer protocol to divide the information over the set of second messages.

In one or more examples, the apparatus may be configured to await receipt of a message from the second network which is sent in response to at least a first of the second messages transmitted on the second network before sending a subsequent extracted second messages on the second network.

In one or more embodiments, said apparatus includes a timer configured to define said predetermined minimum time spacing and wherein the apparatus only allows for said transmission of a subsequent one of said extracted second messages after said timer determines that said predetermined minimum time spacing has expired following transmission of a preceding message of said extracted second messages.

In one or more embodiments, said flow identifying information comprises at least one of:
at least part of a message header of the extracted second message;
information that identifies the source of the extracted second message; and
at least part of a data field of the extracted second message.

In one or more embodiments, said predetermined minimum time spacing is defined based on information contained in a flow control message received from said node coupled to the second network, said flow control message received following transmission of a first of said extracted second messages that belong to the same flow and defining one or more parameters for controlling the sending of messages to said node.

In one or more embodiments, said first protocol comprises one of Ethernet, Token Ring protocol, Synchronous optical networking protocol, frame relay protocol, Asynchronous Transfer Mode protocol.

In one or more embodiments, said second protocol comprises one of a Controller Area Network protocol, a FlexRay protocol, and LIN protocol.

In one or more embodiments, the predetermined minimum time spacing used by the apparatus in the transmission of the extracted second messages is dependent on the flow to which the second message belong.

Thus, different predetermined minimum time spacings may be used for different flows.

According to a second aspect of the disclosure, we provide a system comprising the apparatus of any preceding embodiment in combination with a transport apparatus remote from the apparatus, wherein said transport apparatus is configured to: receive information for sending to the node coupled to the second network; determine whether said information is of a size such that it can be sent in a single protocol data unit message of said second protocol or multiple protocol data unit message of said second protocol; if said information requires sending in multiple protocol data unit messages, generate said plurality of second messages based on a transport layer protocol; encapsulate said second messages in said one or more first messages encoded according to the first protocol; transmit said one or more first messages to the apparatus.

In one or more examples, said transport apparatus is configured to add a sequence number to each of the second messages, the sequence number configured to designate an order of the plurality of second messages for use in reassembling, by the node coupled to the second network, the information divided over the plurality of second messages.

In one or more embodiments, the transport apparatus is configured to receive said information from the first network and is configured to determine, based on an identifier associated with the information, that the information is for the node coupled to the second network. In other examples, the transport apparatus may be configured to generate the information.

In one or more embodiments, the transport layer protocol comprises the CAN-TP Protocol.

In one or more embodiments, if said information can be sent in a single protocol data unit, generate said second message containing the information without use of said transport layer protocol.

In one or more embodiments, said apparatus is configured to receive a flow control message from said node coupled to the second network, wherein said flow control message defines one or more parameters for controlling the sending of messages to said node and wherein said apparatus is configured to forward said flow control message to the transport apparatus via the first network by encapsulating said flow control message within a message according to the first protocol and transmitting the message via the first network.

In one or more embodiments, said transport apparatus is configured to, upon receipt of the message that encapsulates the flow control message, extract said flow control message and, based on a block size parameter specified in the flow control message, encapsulate said second messages in said one or more first messages such that the number of second messages encapsulated in any one first message is no greater than the block size parameter.

According to a third aspect of the disclosure, we provide a method of operating an apparatus that provides an interface between a first network configured to operate based on a first protocol and at least a second network configured to operate based on a second protocol, different to the first protocol. The method comprises receiving, at a receive terminal, one or more first messages from the first network encoded according to the first protocol wherein said one or more first messages encapsulate a plurality of second messages; extracting said encapsulated second messages from said one or more first messages; determining, for each of said extracted second messages and based on a flow identifying information of each of said extracted second messages, a flow to which the extracted second message belongs, said flow comprising a set of extracted second messages; and for said extracted second messages that belong to the same flow, providing for transmission of said extracted second messages on the second network encoded based on the second protocol with a time spacing therebetween greater than a predetermined minimum time spacing.

In one or more embodiments, the method includes generating, by a transport apparatus coupled to the apparatus by the first network, the plurality of second messages according to a transport layer protocol and generating the one or more first messages by encapsulation of the second messages, wherein the first messages are generated in accordance with the first protocol for transmission on the first network to the apparatus.

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments falling within the spirit and scope of the appended claims are covered as well.

The above discussion is not intended to represent every example embodiment or every implementation within the scope of the current or future Claim sets. The figures and Detailed Description that follow also exemplify various example embodiments. Various example embodiments may be more completely understood in consideration of the following Detailed Description in connection with the accompanying Drawings.

BRIEF DESCRIPTION OF THE DRAWINGS

One or more embodiments will now be described by way of example only with reference to the accompanying drawings in which.

DETAILED DESCRIPTION

A network protocol that defines the operation of a network may define a size limit on a message that may be sent over the network. Such a message may be known as a protocol data unit (PDU), that is a single unit of information that is for transmission on a network. In a CAN network, the protocol data unit is known as a frame and in other network protocols it may be known as a packet or by some other name. In CAN, the size limit for information sent in a single protocol data unit may be eight bytes. Thus, the transfer of a large amount of information (greater than the size limit of a single protocol unit) over such networks requires the information to be divided into smaller parts and sent piece by piece in a flow of a plurality of messages or protocol data units. The rules for sending such flows is defined by a transport layer protocol.

Network protocols may therefore use traffic shaping, which is a technique used in networking to make sure that traffic egressing from a certain node adheres to a predefined shape, e.g. limited bursts or spacing between PDUs. It is used to avoid overloading of networking or receiver resources. In some cases, it can also be used as a security measure, as it prevents flooding of a communication bus during a denial of service attack. Examples of traffic shapers are leaky bucket and credit based shaper.

While the disclosure has broader scope, we disclose that, in a CAN network, there is the CAN transport layer protocol, known as CAN-TP, defined in ISO 15764-2 which defines how each CAN frame is structured and how the flow of messages are sent over the network. The rules may define, among other parameters, timing requirements regarding when messages are to be sent on the network or when replies are to be received. Networks other than CAN may also have transport layer protocols that define one or more similar rules.

In some network architectures, such as for upcoming in-vehicle network architectures, the tunnelling of CAN protocol PDUs over Ethernet is gaining traction. Tunnelling is a way of sending a "first" message of a first network protocol over a network that is configured to operate based on a second network protocol. In general terms, it is achieved by placing the first message or PDU (in a format according to the first protocol of the first network) within a second PDU, such as in a data field of the second PDU, wherein the second PDU is in a format according to the second protocol of the second network. Thus, one or more CAN frames (first PDU) may be sent over an Ethernet network by treating the CAN frame as the data of a Ethernet frame or User Datagram Protocol datagram (second PDU). When the second PDU reaches the edge of the CAN network, the first message or PDU may be unpacked from it by a gateway device and sent on the CAN network. The placement of one or more first PDUs in one or more second PDUs for the purpose of tunnelling is known as encapsulation.

In one or more examples, it has been found that challenges exist when transport layer protocols are used with tunnelling, where there is encapsulation of PDUs that are part of a flow of PDUs intended for delivery on a network operating according to a different protocol.

Figure 1:
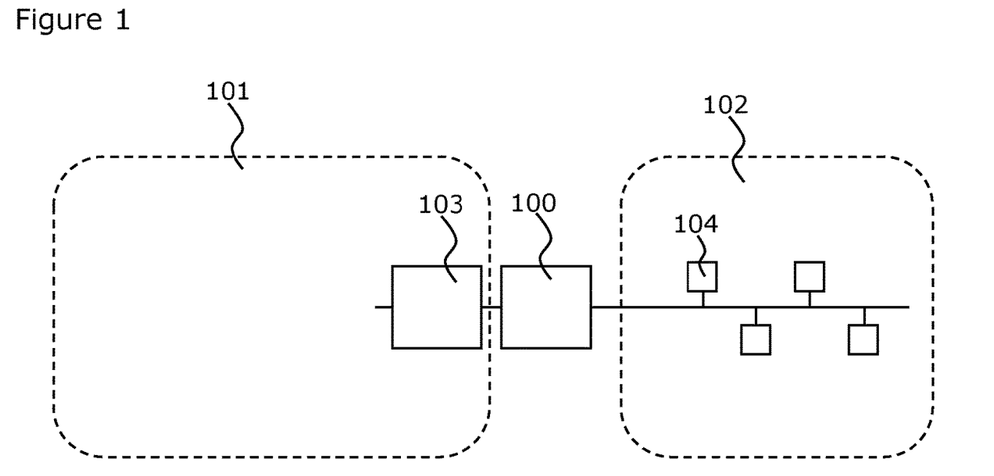
FIG. 1 shows an example embodiment of an apparatus and a transport apparatus coupled between two different networks.

In general and in one or more examples, we disclose an apparatus 100 for providing an interface between a first network 101 configured to operate based on a first protocol and at least one second network 102 configured to operate based on a second protocol, different to the first protocol. In one or more examples, the apparatus 100 may be provided in combination with a transport apparatus 103. The transport apparatus 103, in one or more examples, may be considered part of the first network 101 (i.e. a node of the first network configured to send and receive data onto the first network according to the first protocol). The transport apparatus 103 may be configured to implement a transport layer protocol to generate for a plurality of PDUs to be sent over the second network 102 to a destination node 104 coupled to the second network 102. The transport apparatus 103 may be configured to tunnel the plurality of PDUs configured in accordance with the transport layer protocol to the apparatus 100. Thus, the transport apparatus 103 may be configured to implement a subset of the rules of the transport layer protocol. However, in some examples, it may not be possible for the transport apparatus 103 to implement all of the rules of the transport layer protocol if it is required to tunnel a flow of PDUs to said apparatus 100. Accordingly, the apparatus 100 may be configured to implement a different subset of one or more rules of the transport layer protocol. The apparatus 100 has a direct connection to the second network 102 unlike the transport apparatus 103 and therefore is able to transmit the flow of PDUs that are in a format according to the protocol of the second network 102 to the destination node 104 in accordance with the second subset of transport layer protocol rules.

This arrangement of a transport apparatus 103 forming a flow of PDUs according to a transport layer protocol and then, rather than transmitting them on the second network 102 directly, tunnelling them to the apparatus 100 at the edge of the second network 102 is an advantageous arrangement. In particular, when the transport apparatus 103 is the source of the information it may be efficient in some examples for the transport apparatus 103 to be responsible for forming the flow, which can reduce the overall use of computing resources.

In the examples herein, the first network 101 is a Ethernet network operating according to the Ethernet protocol, although other types of first network 101 are within the scope of this disclosure. In the examples described herein, the second network 102 is a Controller Area Network operating based on the CAN protocol (or extensions to the classical CAN protocol such as CAN-FD), although other types of second network 102 are within the scope of this disclosure.

In the examples that follow, the apparatus 100 and the transport apparatus 103 are configured, in combination, to implement the transport layer protocol, CAN-TP for sending a flow of CAN frames on the second, CAN network 102. In particular, the transport apparatus 103 divides the information into a plurality of messages and tunnels them to the apparatus 100. The apparatus 100 in combination with the node with which it is communication may be configured to implement the one or more "traffic shaping" rules of the transport protocol. Communication between the apparatus 100 and the transport apparatus 103 however, is based on the first protocol of the first network.

Figure 2:
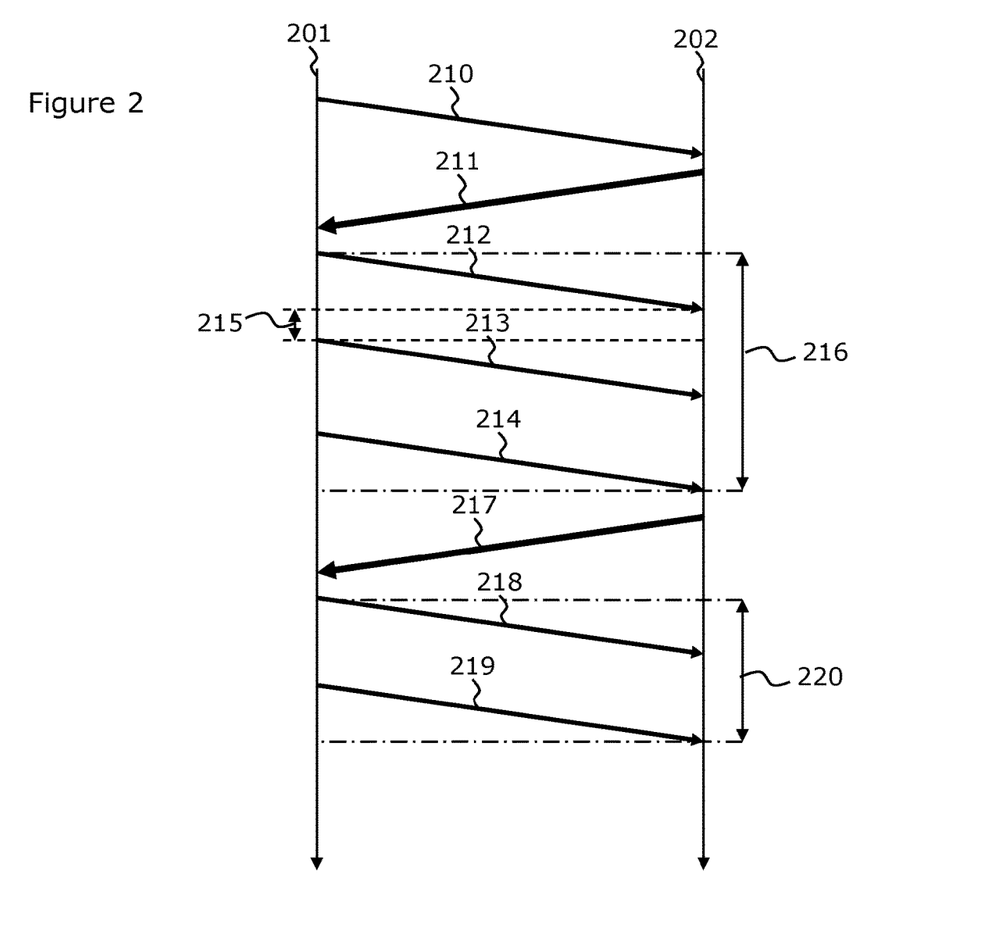
FIG. 2 shows an exchange of messages between a first node and a second node on a CAN network according to CAN-TP.

Example FIG. 2 shows an exchange of messages between a sender 201 and a receiver 202 that provides for transmission of a flow of messages according to the CAN-TP protocol. Thus, the information that is to be sent from the sender 201 to the receiver 202 will be segmented over the flow of messages shown in FIG. 2. FIG. 2 also shows the parameters of operation of CAN-TP as described in ISO15765-2:2016.

CAN-TP defines the sending of a flow of messages (CAN frames or CAN PDUs) as follows. The sender 201 sends a first frame message 210. The first frame message 210 is the first message of the multi-frame message flow and may contain a designation of the length of the information to be sent over the multiple messages. The first frame 210 may also include an initial part of information to be sent. The receiver 202 should respond to a first frame message 210 with a flow control frame message 211. The flow control frame 211 defines one or more parameters to control how the flow is to be sent (e.g. some of the rules of the transport layer protocol). In particular, the flow control frame 211 defines a Block Size parameter (BS) and a minimum time spacing between consecutive message parameter, known as $ST_{min}$. The BS parameter defines the number of consecutive frames the sender 201 can send before the receiver will send an acknowledgment message. The flow control message 211 may be used by the receiver 202 to define how it receives the flow of messages to avoid it becoming overloaded or to be within processing limitations of the receiver 202. In this examples, the BS parameter is three messages.

Following receipt of the flow control message 211, the sender 201 sends a first consecutive frame message 212, a second consecutive frame message 213 and a third consecutive frame message 214 (three messages in total to meet the BS parameter). It will be appreciated that the three consecutive frame messages contain the segmented information that is to be sent from the sender 201 to the receiver 202. The time spacing between each of the consecutive frame messages 212, 213, 214 can be no shorter than $ST_{min}$ 215. Thus, the time spacing between the messages 212, 213, 214 may be greater. For example a different node in the second network 102 may win arbitration during the transmission of the messages 212, 213, 214 and therefore the time spacing between the messages 212, 213, 214 may be much greater than $ST_{min}$ 215. The block size parameter is shown as group 216 illustrating the three message limit.

After the third consecutive frame message 214, the sender 201 waits for an acknowledgement. The receiver 202 should acknowledge the first block of three consecutive frame messages 212, 213, 214 with a second flow control frame 217. The second flow control frame 217 can again define one or more parameters to control how the flow is to be sent. In particular, the second flow control frame message 217 defines the Block Size parameter again and the $ST_{min}$ parameter again. The BS and $ST_{min}$ parameters may change or stay the same. FIG. 2 shows a fourth consecutive frame message 218 and a fifth consecutive frame message 219. In this example, this completes the sending of the flow, comprising the first frame message 210 and the first to fifth consecutive frame messages 212-214, 218, 219. It will be appreciated that the block of messages 220 comprising the fourth and fifth consecutive frame messages 218, 219 is less than or equal to the number of messages defined by the BS parameter in the second flow control frame message 217. Likewise, the minimum time spacing between the fourth and fifth consecutive frame messages 218, 219 is greater than or equal to the $ST_{min}$ parameter defined in the second flow control frame message 217.

In this example of a CAN implementation of the second network 102, it is the implementation of the minimum time spacing defined by parameter $ST_{min}$ that the apparatus 100 is configured to provide. It will be appreciated that other protocols may have similar parameters.

Figure 3:
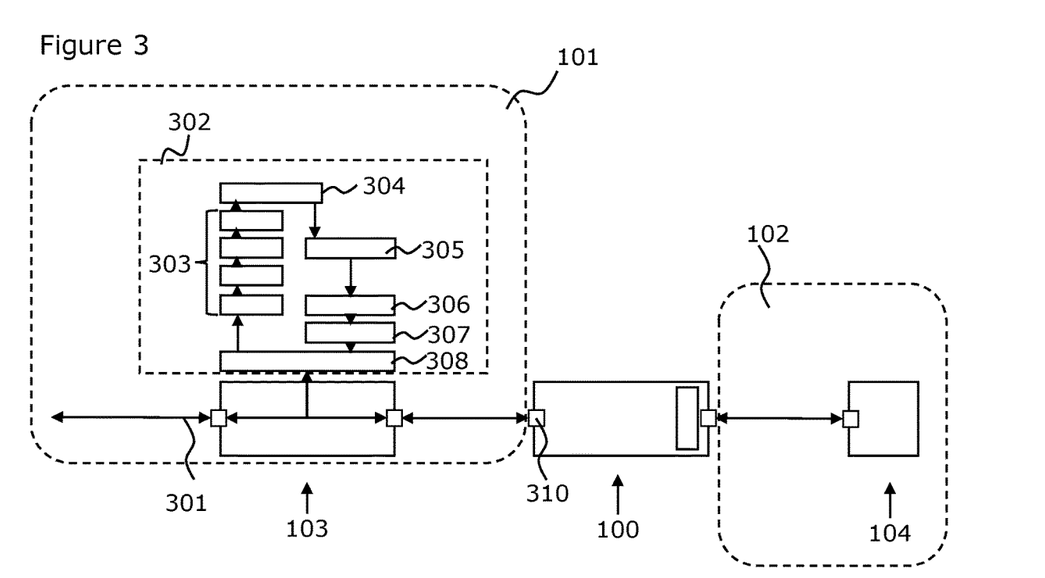
FIG. 3 shows an example view of an apparatus configured to control the timing of the dispatch of messages on to a CAN or other network, and a transport apparatus showing an example protocol stack illustrating the implementation of a transport layer protocol.

Example FIG. 3 shows a more detailed view of FIG. 1. The transport apparatus 103 is shown having a terminal 301 coupled to the Ethernet network 101 to receive one or more messages containing information intended for one of the nodes 104 of the CAN network 102. In other examples, the information for the nodes 104 of the CAN network 102 may originate at the transport apparatus 103.

FIG. 3 also shows a protocol stack 302 (which may be formed of multiple stacks) provided by a processor of the transport apparatus 103 to illustrate the operation of the transport apparatus 103.

The messages received from the first, Ethernet, network 101 received at terminal 301 are provided to the protocol stack 303. The messages are received by one or more agents including (from bottom of the stack 303 shown in FIG. 3 to the top) EthIF, TCP/IP, SoAd, DoIP which will be familiar to those skilled in the art of AUTOSAR. EthIf is the Ethernet Interface used to transmit/receive Ethernet frames; TCP/IP is the stack implementing TCP, UDP, and IP etc; SoAd is a Socket Adaptor, which translates between I-PDUs and sockets of the TCP/IP stack; and DoIP is diagnostics over IP, which comprises a diagnostic protocol that works over Ethernet.

If the message(s) received by the transport apparatus 103 comprises information intended for the second, CAN, network 102, then a protocol data unit router module 304 routes the message(s) to a second protocol stack 302 that handles CAN messages. If the information can be sent in a single CAN frame, then the transport apparatus 102 may be configured to forward it to the apparatus 100 for sending. If the information is of a size to require sending over multiple CAN frame messages (PDUs) then the information may be provided to a CAN-TP module 305 that provides for implementation of the CAN transport layer protocol CAN-TP.

The CAN-TP module 305 receives the information and generates a plurality of CAN messages (i.e. termed second messages in this example) according to the CAN-TP protocol, in order to send the information. Thus, the information is segmented over a plurality of CAN frame messages that are termed a flow of messages.

The CAN-TP module 305 may be configured to add a sequence number to each of the second messages of the flow. The sequence number may be configured to designate an order of the plurality of second messages for use in reassembling, by the node 104, the information that is divided over the plurality of second messages generated by the module 305.

The information for sending to the CAN network may be provided in response to a request coming over DoIP, e.g. a firmware update.

A CAN-IF module 306 is the CAN interface module used to transmit/receive CAN frames.

A CAN-to-Ethernet (known as CAN2ETH) module 307 provides for encapsulation of the second messages received from the CAN-TP module 305 in some protocol over Ethernet. In this process, it could be that one CAN message is encapsulated in one Ethernet frame, or that multiple CAN messages of the messages generated by the CAN-TP module 305 are encapsulated within the Ethernet frame. It will be appreciated that the CAN2ETH module 307 may be configured to encapsulate CAN frame messages that have not been processed by CAN-TP, perhaps because it was not necessary given the size of the information they were carrying. Thus, the protocol data unit router module 304 may forward messages that do not require processing by a transport protocol to the CAN2ETH module 307 bypassing the CAN-TP module 305 and the CAN-IF module 306.

The CAN2ETH block 307 may be preconfigured to include a predetermined number of CAN frames in each Ethernet frame. The predetermined number may be equal to or less than a known Block Size parameter of the nodes 104 in the second network 102 (which may be known at the time of building of the network 102 and/or configuring the apparatus 100 and transport apparatus 103). In other examples, the predetermined number may be configured based on the block size parameter BS in the flow control frame message 211, 217 by the apparatus 100, which may be forwarded to the transport apparatus 103 after a first message of the flow has been sent. Thus, in some examples, for a particular CAN-TP flow, the number of CAN messages that the transport apparatus provides inside one Ethernet frame generated by module 307 may be no greater than the block size parameter (but could be smaller). It will be appreciated that the total number of CAN messages in the Ethernet frame could be greater if there are CAN frames belonging to multiple different flows.

In other examples, the transport apparatus 305 may be configured to place any number of second messages of the flow in an Ethernet frame and may rely on the apparatus 100 to dispatch the second messages in groups according to the Block Size parameter.

The CAN2ETH block 307 thus generates one or more first messages, comprising Ethernet messages, each having one or more second messages, comprising the CAN frame messages, encapsulated therein. The Ethernet format, first messages are then sent on the Ethernet network, represented by block 308, to the apparatus 100.

The information (which may be in the form of one or more CAN messages) may be encapsulated within the payload fields of an Ethernet frame or a UDP message received at terminal 301. If encapsulated in a UDP datagram, each second message may be associated with an identifier from which the CAN ID of the node 104 to which the second message is to be addressed can be determined (or may be indicative of the sender of the second message). Such an encapsulation will be known to those skilled in the art as AUTOSAR Socket Adapter Header Mode. In a further example, the encapsulation of the CAN messages (second messages) may be provided according to the principles of IEEE 1722 AVTP ACF. Thus, the apparatus 100 and, optionally, the transport apparatus 103 may receive messages than include encapsulated therein second messages within the ACF message payload. Typically, an ACF message is transmitted directly over Ethernet, but UDP/IP is optional. An example of this message format can be found in the IEEE 1722-2016 standard, FIG. 54.

The apparatus 100 comprises at least a receive terminal 310 coupled to the first network 101 for receiving messages from the transport apparatus 103. The receive terminal 310, is configured to receive the one or more first messages from the transport apparatus 103 of the first network encoded according to the first protocol (whichever over-Ethernet protocol was used by the CAN2ETH block 307). As mentioned above, said one or more first messages encapsulate a plurality of second messages for the CAN network 102. Further, it will be appreciated that at least two or more of the CAN, second messages encapsulated within the Ethernet, first messages is part of a flow generated by the CAN-TP transport layer protocol block 305.

The functionality of the apparatus 100 will now be described with reference to FIG. 4, which shows the apparatus 100 of FIG. 3 in more detail.

Figure 4:
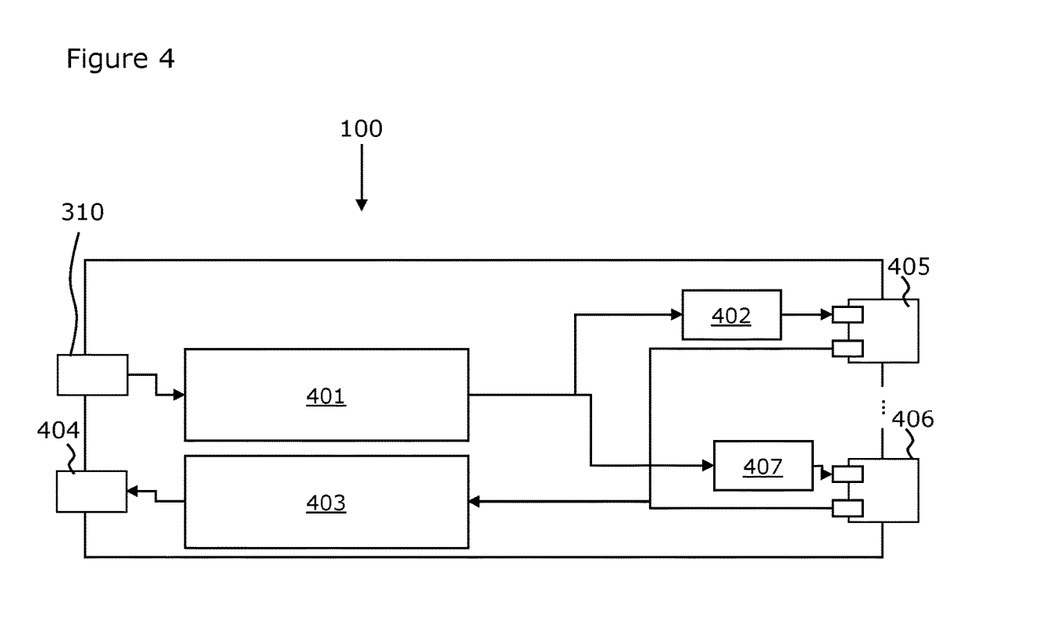
FIG. 4 shows a more detailed view of the apparatus shown in FIG. 3.

FIG. 4 shows the receive terminal 310 for receiving the first messages from the Ethernet network 101. The apparatus 100 may include a message processing block 401 configured to extract said encapsulated second messages from said one or more first messages.

The processing block 401 may also determine, for each of said extracted second messages and based on flow identifying information present in each of said extracted second messages, a flow to which the extracted second message belongs. In some transport layer protocols, an identifier may be added to each message that is part of the same flow. Thus, such an identifier can be used by the receiver 104 to reassemble the correct messages into the original information. In one or more examples, the flow identifying information may comprise at least part of the CAN ID or other header information of each of the second messages. Thus, it may be determined that all second messages that have the same CAN ID are part of the same flow, in some examples. In other examples, the processing block 401 may be configured to determine, for each of said extracted second messages and based on at least part of the CAN ID in each of said extracted second messages and at least part of a data field of each of said extracted second messages, the flow to which the extracted second message belongs. In other seconds protocols, the flow identifying information may be a dedicated field associated with transport protocol processed messages. Thus, depending on the transport protocol or implementation, the flow identifying information can take different forms but in summary it may comprise a part of the second message that identifies the flow to which the second message belongs either directly or indirectly. The flow identifying information may be indicative of a source node address or a unique identifier or group of unique identifiers associated with a source of the second messages. The flow identifying information may comprise part of the information carried in a data field of the second message and/or a message header. The flow identifying information may comprise a value in the second message which can be cross-referenced with a lookup table to determine the flow to which the second message belongs.

In one or more examples, the second messages are then passed to a traffic shaping block 402 which is configured to, for said extracted second messages that belong to the same flow, provide for transmission of said extracted second messages on the second network 102 encoded based on the second, CAN protocol with a time spacing therebetween greater than a predetermined minimum time spacing based on $ST_{min}$. Thus, the apparatus 100 may be configured to queue the one or more second messages for sending and then send the consecutive frame messages of the flow respecting the minimum time spacing based on $ST_{min}$.

It will be appreciated that a first of the plurality of second messages, comprising the first frame message 210 will be sent first and the apparatus 100 may be configured to await the first flow control message 211. The apparatus 100 may use the $ST_{min}$ information in the first flow control message 211 (and any subsequent flow control message 217) to set the predetermined minimum time spacing.

In other examples, the predetermined minimum time spacing or $ST_{min}$ parameter of at least one of nodes in the network 102 may be known and therefore the apparatus 100 may have a predetermined minimum time spacing to use. The predetermined minimum time spacing may be used without reading of the $ST_{min}$ parameter in the first (or optionally subsequent 217) flow control message 211. In other examples, the apparatus 100 may be configured to check the predetermined minimum time spacing against the $ST_{min}$ value and update the predetermined minimum time spacing if required.

The subsequent second messages comprise the first block of "consecutive frame messages" and are sent with a time spacing therebetween greater than or equal to the predetermined minimum time spacing. The message exchange proceeds as described in relation to FIG. 2, wherein the apparatus 100 is the sender 201 and the node 104 (or any other addressed node) is the receiver 202.

The apparatus 100 may be configured to forward the first flow control message 211 and any subsequent flow control message 217 to the transport apparatus 101.

The apparatus 100 may include a processing block or, in more specific embodiments, a CAN-to-Ethernet block 403 to encapsulate the flow control CAN message(s) into one or more Ethernet messages, which are then transmitted over Ethernet via a transmit terminal 404 which couples to the Ethernet network and thus to the transport apparatus 103. The transport apparatus 103 will receive encapsulated second message and will be configured to unpack it and process its contents according to the transport layer protocol. In this embodiment, the transport apparatus may be configured to provide it to the CAN-TP module 305. The CAN-TP module 305 then be configured to send the remaining or next block size (BS) worth of second messages until transmission of the information is complete. In other examples, the CAN-TP module 305 may be configured not to await the flow control frames before providing all the CAN messages of the flow to the apparatus 100. Thus, the apparatus 100 may be configured to queue the CAN messages received (in encapsulated form) from the transport apparatus 103 and send them in blocks in accordance with a predetermined B S parameter or which was read from the flow control frame messages 211, 217 by the apparatus 100.

In the example of FIG. 4, the processing block 401 and processing block 403 are shown coupled to a plurality of second networks 102 by first interface 405 and second interface 406. Thus, the apparatus 100 may provide for the predetermined minimum time spacing for a plurality of second networks by way of traffic shaping block 402 and a further traffic shaping block 407 for each other second network 102.

Figure 5:
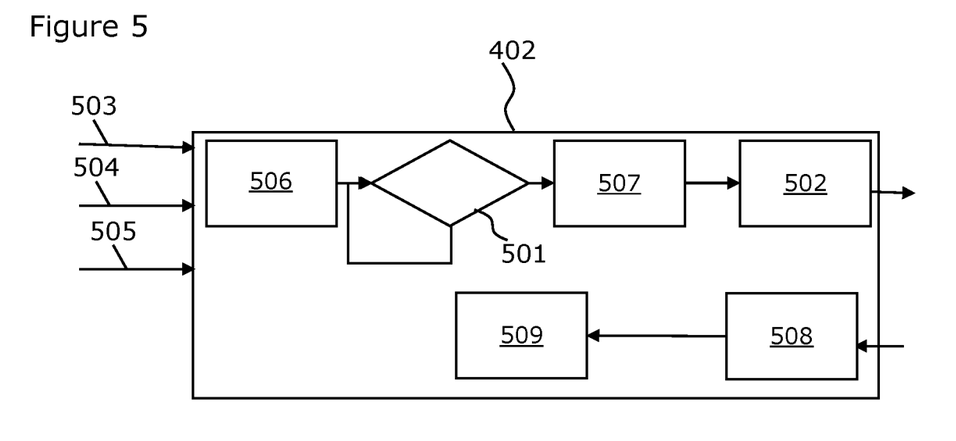
FIG. 5 shows a more detailed view of traffic shaping block of the apparatus shown in FIG. 4.

FIG. 5 shows an example of the traffic shaping module 402 with the functionality represented as a series of blocks. The traffic shaping module 402 includes a timer 501 configured to define said predetermined minimum time spacing. The module 402 includes a dispatch module 502 configured to only allow for said transmission of a subsequent one of the CAN messages of a flow after said predetermined minimum time spacing has expired following transmission of a preceding message in the same block 216, 220 of the flow. In one or more examples, the apparatus 100 may be configured to await an acknowledgement message confirming receipt of each second message before sending the next (as well as adhering to the predetermined minimum time spacing).

The module 402 may be configured to receive each of the CAN messages at input 503. The module 402 may receive the predetermined minimum time spacing at input 504 from the processing module 401. Alternatively, it may be stored at the module 403. The module 402 may receive flow identifying information (which may be derived from CAN ID or other information stated in the second message(s)) at input 505.

Thus, the module 402 may receive the CAN message of the indicated flow at block 506. Until the timer 501 has counted down, the CAN message is held in a queue. Once the predetermined time spacing has expired the module is configured to reset the timer to the predetermined time spacing value at block 507. The message is then dispatched for transmission by block 502, as mentioned previously.

The module 402 also receives the acknowledgement or flow control frame messages at block 508. The predetermined minimum time spacing of the timer 501 may be set to run in response to the flow control message or an acknowledgement of receipt at block 509.

In the examples described above the first protocol was Ethernet and the second protocol was CAN. However, in other examples, said first network may operate based on a first protocol comprising one of Ethernet, Token Ring protocol, Synchronous optical networking protocol, frame relay protocol, Asynchronous Transfer Mode protocol. In other examples, said second network may operate based on a second protocol comprising one of a Controller Area Network (CAN) protocol, a FlexRay protocol, and LIN protocol. It will be appreciated that reference to the CAN protocol here includes CAN-FD and, possibly, the proposed CAN-XL versions of the protocol.

Figure 6:
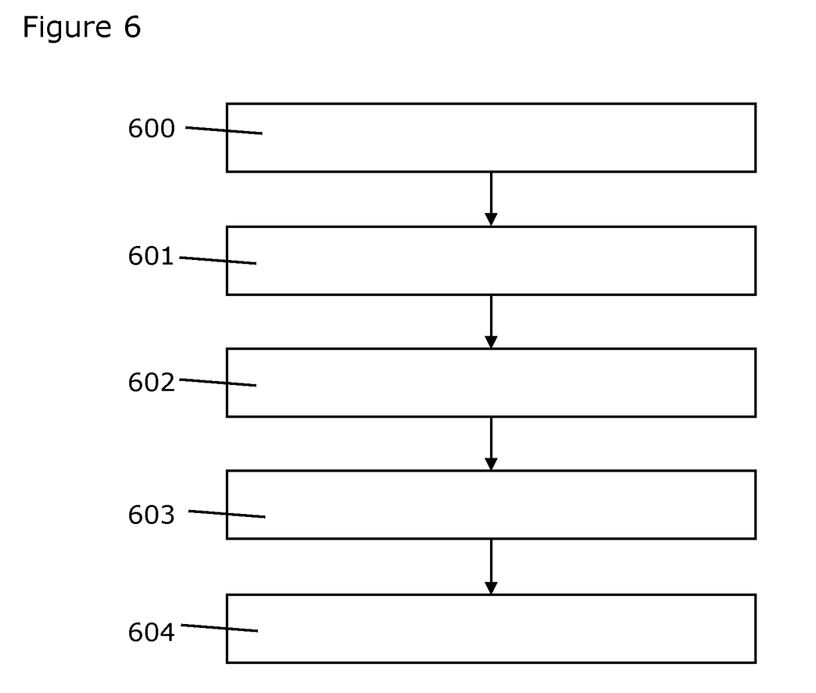
FIG. 6 shows an example flowchart illustrating a method of operating a system.

FIG. 6 shows an example method of operating an apparatus 100 that provides an interface between a first network 101 configured to operate based on a first protocol and at least a second network 102 configured to operate based on a second protocol, different to the first protocol. The method comprising: receiving 601, at a receive terminal, one or more first messages from the first network encoded according to the first protocol wherein said one or more first messages encapsulate a plurality of second messages; extracting 602 said encapsulated second messages from said one or more first messages; determining 603, for each of said extracted second messages and based on flow identifying information of each of said extracted second messages, a flow to which the extracted second message belongs, said flow comprising a set (i.e. a plurality) of extracted second messages that may be for the same node coupled to the second network; and or said extracted second messages that belong to the same flow, providing 604 for transmission of said extracted second messages on the second network encoded based on the second protocol with a time spacing there between greater than a predetermined minimum time spacing.

The method may comprise, performed by a transport apparatus 103 coupled to the apparatus 100 by the first network, the step 600. Step 600 comprises generating a plurality of second messages according to a transport layer protocol and generating one or more first messages by encapsulation of the second messages, wherein the first messages are generated in accordance with the first protocol for transmission on the first network to the apparatus 100.

The instructions and/or flowchart steps in the above figures can be executed in any order, unless a specific order is explicitly stated. Also, those skilled in the art will recognize that while one example set of instructions/method has been discussed, the material in this specification can be combined in a variety of ways to yield other examples as well, and are to be understood within a context provided by this detailed description.

In some example embodiments the set of instructions/method steps described above are implemented as functional and software instructions embodied as a set of executable instructions which are effected on a computer or machine which is programmed with and controlled by said executable instructions. Such instructions are loaded for execution on a processor (such as one or more CPUs). The term processor includes microprocessors, microcontrollers, processor modules or subsystems (including one or more microprocessors or microcontrollers), or other control or computing devices. A processor can refer to a single component or to plural components.

In other examples, the set of instructions/methods illustrated herein and data and instructions associated therewith are stored in respective storage devices, which are implemented as one or more non-transient machine or computer-readable or computer-usable storage media or mediums.

Such computer-readable or computer usable storage medium or media is (are) considered to be part of an article (or article of manufacture). An article or article of manufacture can refer to any manufactured single component or multiple components. The non-transient machine or computer usable media or mediums as defined herein excludes signals, but such media or mediums may be capable of receiving and processing information from signals and/or other transient mediums.

Example embodiments of the material discussed in this specification can be implemented in whole or in part through network, computer, or data based devices and/or services. These may include cloud, internet, intranet, mobile, desktop, processor, look-up table, microcontroller, consumer equipment, infrastructure, or other enabling devices and services. As may be used herein and in the claims, the following non-exclusive definitions are provided.

In one example, one or more instructions or steps discussed herein are automated. The terms automated or automatically (and like variations thereof) mean controlled operation of an apparatus, system, and/or process using computers and/or mechanical/electrical devices without the necessity of human intervention, observation, effort and/or decision.

It will be appreciated that any components said to be coupled may be coupled or connected either directly or indirectly. In the case of indirect coupling, additional components may be located between the two components that are said to be coupled.

In this specification, example embodiments have been presented in terms of a selected set of details. However, a person of ordinary skill in the art would understand that many other example embodiments may be practiced which include a different selected set of these details. It is intended that the following claims cover all possible example embodiments.

The invention claimed is:

1. A system that provides an interface between a first network configured to operate based on a first protocol and at least a second network configured to operate based on a second protocol that is different from the first protocol, the system comprising:
a receive terminal configured to receive one or more first messages from the first network encoded according to the first protocol wherein said one or more first messages encapsulate a plurality of second messages;
wherein the receive terminal is configured to:
extract the plurality of second messages from the one or more first messages;
determine, for each message of the plurality of second messages, and based on flow identifying information of each second message, a flow to which each second message belongs, each flow comprising at least a portion of the plurality of second messages that form a set of second messages; and
for second messages that belong to a first flow, provide for transmission of second messages on the second network encoded based on the second protocol with a time spacing therebetween greater than or equal to a predetermined minimum time spacing to a node coupled to the second network; and
a transport apparatus configured to:
receive information designated for transmission to the node coupled to the second network;
determine whether said information is of a size such that it can be sent in a single protocol data unit message of the second protocol;
generate the plurality of second messages based on a transport layer protocol in response to determining that said information cannot be sent in a single protocol data unit message of the second protocol;
encapsulate said second messages in said one or more first messages encoded according to the first protocol;
transmit the one or more first messages to the receive terminal.

2. The system of claim 1, wherein the receive terminal includes a timer configured to define said predetermined minimum time spacing and wherein receive terminal only allows for said transmission of a subsequent one of said second messages after said timer determines that said predetermined minimum time spacing has expired following transmission of a preceding message of said extracted second messages.

3. The system of claim 1, wherein the flow identifying information of each second message comprises at least part of a message header of that second message.

4. The system of claim 1, wherein the flow identifying information of each second message comprises information that identifies the source of that second message.

5. The system of claim 1, wherein the flow identifying information of each second message comprises at least part of a data field of that second message.

6. The system of claim 1, wherein the predetermined minimum time spacing is defined based on information contained in a flow control message received from the-node coupled to the second network, the flow control message received following transmission of an initial second message that belongs to the first flow and defining one or more parameters for controlling the sending of messages to the node coupled to the second network.

7. The system of claim 1, wherein the first protocol comprises an Ethernet protocol, a Token Ring protocol, a Synchronous optical networking protocol, a frame relay protocol, or an Asynchronous Transfer Mode protocol.

8. The system of claim 1, wherein the second protocol comprises a Controller Area Network protocol, a FlexRay protocol, or a LIN protocol.

9. The system of claim 1, wherein the predetermined minimum time spacing used by the system in the transmission of each second message is dependent on the flow to which that second message belongs.

10. The system of claim 1, wherein the set of the plurality of second messages that form the flow are intended for the node coupled to the second network.

11. The system of claim 1, wherein the set of second messages that comprise the flow collectively comprise information that is divided over the set of extracted second messages.

12. The system of claim 1, wherein the set of second messages that comprise the flow are processed by a transport layer protocol to divide the information over the set of second messages.

13. The system of claim 1 wherein the transport apparatus is remote from the receive terminal.

14. The system of claim 1, wherein the transport apparatus is configured to receive the information from the first network and is configured to determine, based on an identifier associated with the information, that the information is designated for transmission to the node coupled to the second network.

15. The system of claim 1, wherein the transport layer protocol comprises the CAN-TP Protocol.

16. The system of claim 1, wherein the receive terminal is further configured to receive a flow control message from the node coupled to the second network, wherein the flow control message defines one or more parameters for controlling the sending of messages to said node; and wherein the receive terminal is configured to forward said flow control message to the transport apparatus via the first network by encapsulating said flow control message within a message according to the first protocol and transmitting the message via the first network.

17. The system of claim 16, wherein the transport apparatus is configured to, upon receipt of the message that encapsulates the flow control message, extract said flow control message and, based on a block size parameter specified in the flow control message, encapsulate said second messages in said one or more first messages such that the number of second messages encapsulated in any one first message is no greater than the block size parameter.

18. A device comprising a transceiver coupled to first network configured for communication according to a first protocol, the device configured to:

receive information designated for transmission to a node coupled to a second network configured for communication according to a second protocol;

determine whether the information is of a size such that it can be sent in a single protocol data unit message of the second protocol;

generate, in response to determining that the information is of a size that cannot be sent in a single protocol data unit message of the second protocol, a plurality of messages according to a transport layer protocol, wherein each message of the plurality of messages carries a portion of the information designated for transmission to the node coupled to the second network;

encapsulate the plurality of messages in one or more messages encoded according to the first protocol;

transmit, using the transceiver, the one or more first messages to the node coupled to the second network via the first network and according to the first protocol.

19. A method of digital communication between a first network using a first protocol and a second network using a second protocol the method comprising:

receiving, by a node coupled to the first network, information designated for transmission to a node coupled to the second network;

determining whether the information is of a size such that it can be sent in a single protocol data unit message of the second protocol;

generating, in response to determining that the information is of a size that cannot be sent in a single protocol data unit message of the second protocol, a plurality of first messages using a transport layer protocol, wherein each message of the plurality of first messages carries a portion of the information designated for transmission to the node coupled to the second network;

encapsulating the plurality of messages in one or more messages encoded according to the first protocol;

transmitting the one or more first messages to the node coupled to the second network via the first network according to the first protocol.

20. The method of claim 19, further comprising:

receiving, via the first network by a receive terminal coupled to the first network and the second network, the one or more messages encoded according to the first protocol;

extracting, by the receive terminal, the plurality of messages from the one or one or more messages encoded according to the first protocol;

determining, based on flow identifying information of each of the plurality of messages, a flow to which the plurality of messages belongs; and causing the plurality of messages to be transmitted to the node coupled to the second network via the second according to the second protocol with a time spacing between each of the plurality of messages that is greater than or equal to a predetermined minimum time spacing.

* * * * *